(No Model.) 2 Sheets—Sheet 1.

A. D. WALLEN.
HARROW.

No. 455,647. Patented July 7, 1891.

Witnesses:
E. P. Ellis
L. L. Lehmann

Inventor
A. D. Wallen
per Lehmann & Pattison,
Attys.

(No Model.) 2 Sheets—Sheet 2.

A. D. WALLEN.
HARROW.

No. 455,647. Patented July 7, 1891.

Witnesses:
E. P. Ellis
L. L. Lehmann

Inventor
A. D. Wallen
per Lehmann & Pattison,
Attys.

UNITED STATES PATENT OFFICE.

ALLEN D. WALLEN, OF CANE HILL, MISSOURI.

HARROW.

SPECIFICATION forming part of Letters Patent No. 455,647, dated July 7, 1891.

Application filed January 16, 1891. Serial No. 378,029. (No model.)

*To all whom it may concern:*

Be it known that I, ALLEN D. WALLEN, of Cane Hill, in the county of Cedar and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in the combination and arrangement of parts, which will be more fully described hereinafter, whereby a simple and efficient harrow is produced.

The objects of my invention are to provide a means whereby the entire harrow can be supported upon wheels for the purpose of being transported from one place to another and thus prevent the teeth from being brought into contact with the earth, and to hold the folding wings down in contact with the ground when obstructions are encountered.

Figure 1:
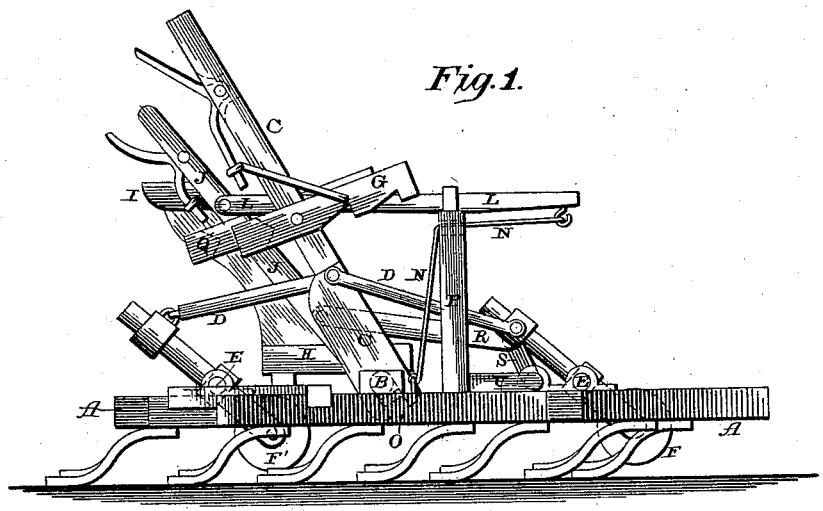
Figure 2:
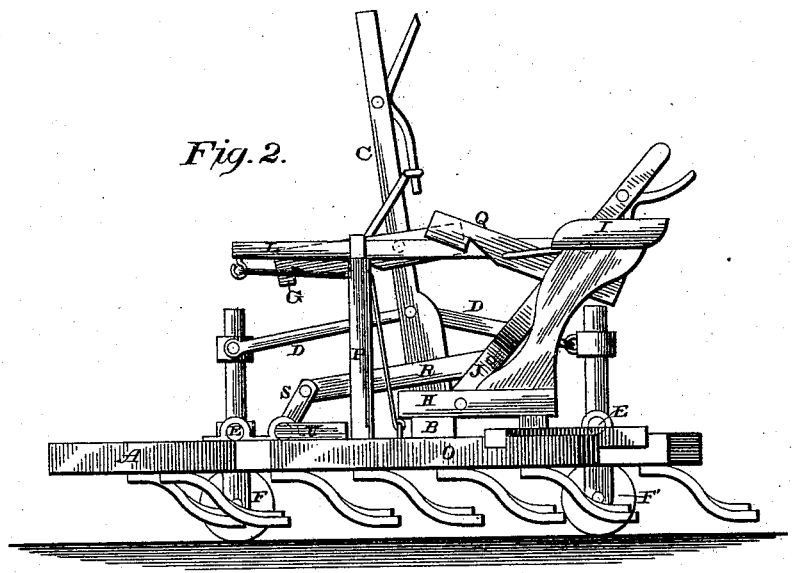
Figure 3:
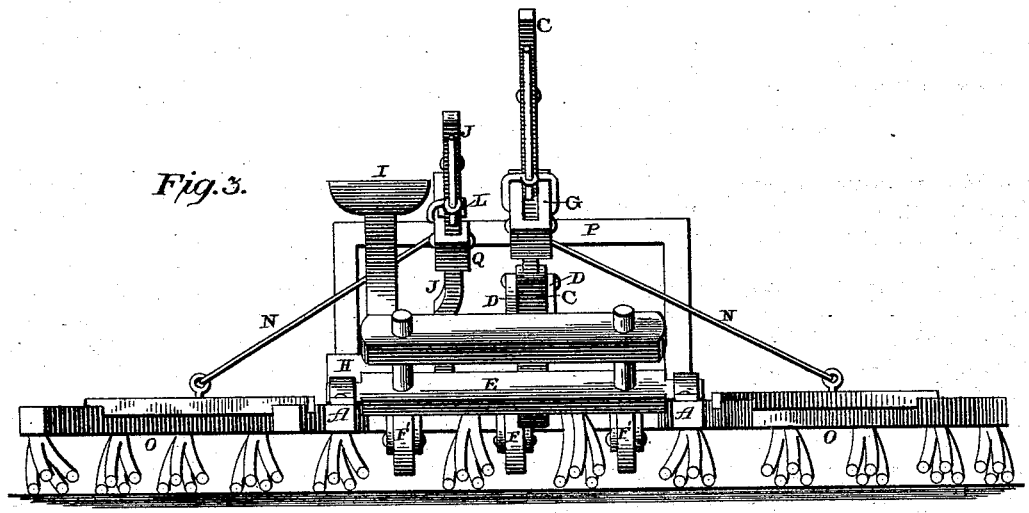
Figure 4:
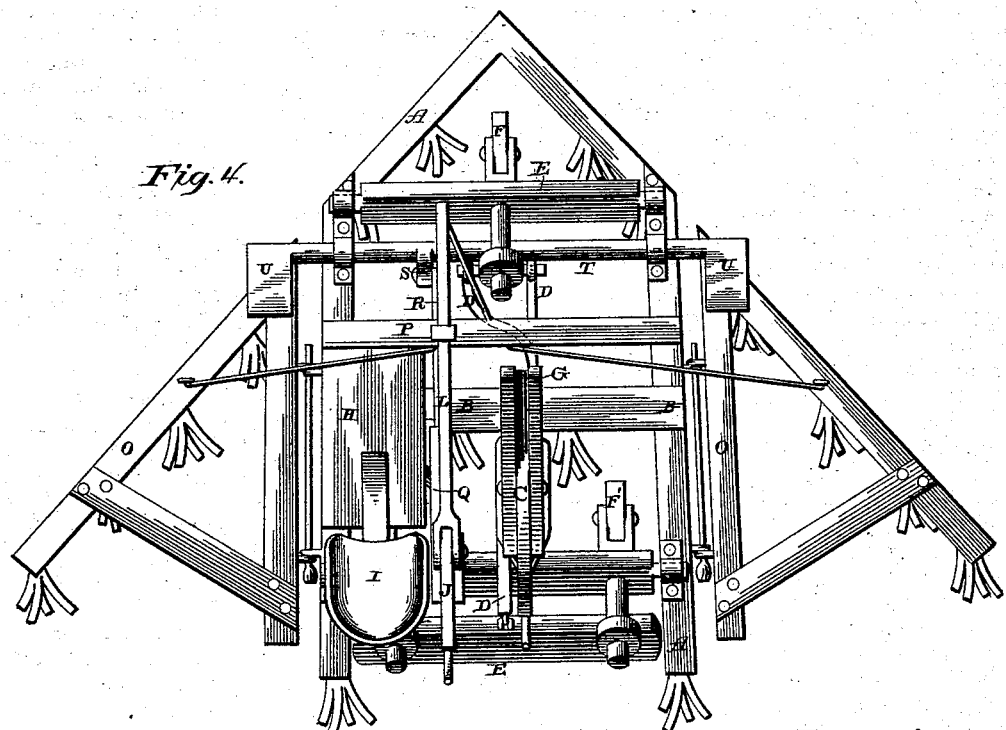

Figures 1 and 2 are side elevations of a harrow which embodies my invention, taken from opposite sides, one of the figures showing the teeth in operation and the other showing the harrow supported by its wheels. Fig. 3 is a rear elevation of the same. Fig. 4 is a plan view.

A represents the frame, of any suitable construction, but which is preferably made pointed at its front end, and which is braced by the cross-piece B, which serves as a support for the operating parts, and to the under side of which a suitable number of teeth are secured. Journaled upon this cross-piece B is the operating-lever C, which extends upward any desired distance, and which is connected by the rods D with the two axles E, which are journaled upon the top of the frame A. Through the front axle extends the shank of a single wheel F, and through the rear axle extends the shanks of two wheels F', and these wheels serve to raise the harrow above the ground for transportation from one place to the other, and that without allowing the teeth to come in contact with the ground. These axles E, when the lever C is inclined backward, are turned into such a position that the shanks of the wheels do not allow their wheels to touch the ground, but when the upper end of the lever is forced forward the axles serve as levers to raise the harrow. Connected to this lever is the catch G, which is operated by a small hand-lever attached to the main one C, and this catch serves to hold the axles and wheels in any position desired.

Mounted upon the cross-piece B is the board H, and from this board rises the driver's seat I. Pivoted upon the inner edge of this board H is the lever J, which has pivoted to it near its upper end the rod L, to the front end of which is fastened two cords, wires, or chains N, by means of which the side wings O are raised. The front of the rod L is supported by the frame P, which rises from the frame A, and the cords or wires pass back through openings through the top of the frame, and which serves as a guide to change the directions of the cords or wires, as shown. Also pivoted to this lever J is a catch Q, which is operated by a hand-lever attached to the lever J, and by means of which the lever is held in any desired position. Both of the catches catch over the top edge of the frame P. When this lever is moved forward at its upper end, the rod L exerts a pull upon the side wings O and raises them into a vertical position. When the catch upon this lever is freed from the frame P, the wings O drop from their own gravity and force the lever J backward into position. Also fastened to this lever J is the rod R, which extends forward and connects with an arm S, that extends upward from a partially-revolving rod or shaft T. Upon each end of this rod or shaft T is a flat plate or holding device U, which rests upon the tops of the front ends of the wings, and thus holds the wings down in contact with the earth when obstructions are encountered. The forward movement of the lever J causes the rod or shaft T to revolve, so as to raise these plates, and thus not interfere with the rising movements of the wings, and when the lever J returns to position the plates are drawn backward, so as to rest upon the tops of the wings. The driver by drawing backward upon the upper end of the lever J can exert any desired amount of pressure through the plates upon the tops of the wings, so as to prevent them from rising when any obstruction is reached.

To the under side of the frame and the wings, at any suitable points, are secured suitable teeth X, which may either be of the form here shown or any other that may be preferred.

Having thus described my invention, I claim—

1. In a harrow, the combination of a lever provided with means for holding it in any desired position, a connecting-rod, and a partially-revolving rod or shaft provided with holding devices upon its ends with the wings, which are loosely connected to opposite sides of the main frame of the harrow, substantially as shown.

2. In a harrow, a frame carrying harrow-teeth, horizontal axles journaled thereon, vertical rods secured to the axles, having supporting-wheels journaled in their lower ends, an operating-lever, and a connection between the upper ends of the rods and the operating-lever, the parts combined substantially as described.

In testimony whereof I affix my signature in presence of two witnesses.

ALLEN D. WALLEN.

Witnesses:
W. M. WARNER,
C. HAYLE HAYWARD.